A. LUTHY.

Assignor, by mesne Assignments, to K. HUTTER.

Bottle-Stopper Fastener.

No. 8,234. Reissued May 14, 1878.

Witnesses

O. Briesen

John C. Tumbridge

Inventor:

Adolph Luthy by his attorney

A. V. Briesen

N. PETERS, PHOTO-LITHOGRAPHER, WASHINGTON, D. C.

UNITED STATES PATENT OFFICE.

ADOLPH LUTHY, OF NEW YORK, N. Y., ASSIGNOR, BY MESNE ASSIGNMENTS, TO KARL HUTTER.

IMPROVEMENT IN BOTTLE-STOPPER FASTENERS.

Specification forming part of Letters Patent No. 169,456, dated November 2, 1875; Reissue No. 8,234, dated May 14, 1878; application filed April 22, 1878.

*To all whom it may concern:*

Figure 1:
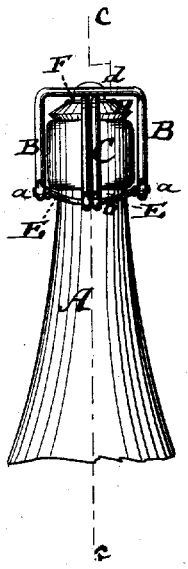
Figure 2:
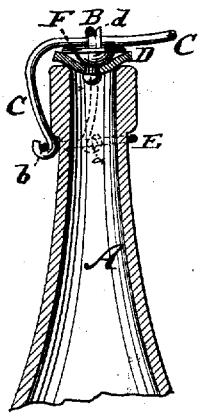
Figure 3:
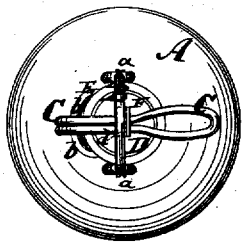

Be it known that I, ADOLPH LUTHY, of the city, county, and State of New York, have invented a new and Improved Bottle-Stopper, of which the following is a specification:

In the accompanying drawing, Figure 1 represents a side elevation; Fig. 2, a vertical central section on line *c c*, Fig. 1; and Fig. 3, a top view of my improved bottle-stopper.

Similar letters of reference indicate corresponding parts in the several figures.

My invention has reference to a simple stopper mechanism for beer, wine, and other bottles, and it consists of a curved spring-lever that carries the stopper and connects to the neck-wire, and of its combination with a bail, which also connects with the neck-wire.

In the drawing, A represents a common beer or other bottle, to the neck of which is applied the swinging bail B by a neck-wire, E, in the customary manner—that is to say, the ends of the bail B are pivoted to diametrically-opposite parts *a a* of the neck-wire, which parts *a* are shown to be projecting pivot-pins. Intermediately between the pivot-eyes of the bail B and between the pivots *a a* is hung, in a loop, *b*, which is formed on the neck-wire, a curved spring-lever, C, that extends over the mouth of the bottle, and carries a stopper, D, which is attached to the spring-lever by a perforated lug, *d*, of its metallic cap-piece F. The stopper is made in any suitable manner of a rubber disk or cap, applied to the metallic button or core of its top or cap piece F. It may also be made entirely of rubber or other material, provided that a tight closing of the bottle is produced.

The top lug or rest *d* is recessed at the side toward the bail B, for providing a bearing for the same when thrown up to retain the stopper. After the stopper has been inserted into the bottle-mouth the lever C is pressed tightly on the stopper, and the bail then slid up over the same, holding both stopper and lever firmly in position by the spring-action of the stopper and lever, and by the treble connection with the neck-wire.

In this manner a cheap and readily-operated bottle-stopping device is obtained.

By the term "locking-lever" in this specification I have reference to the lever which connects with and extends beyond the stopper and serves as a handle for pressing the same into the mouth of the bottle.

Having thus described my invention, I claim as new and desire to secure by Letters Patent—

1. The neck-wire E, combined by two pivots, *a a*, with the bail, and by one pivot, *b*, with the locking-lever of a bottle-stopping device, substantially as herein shown and described.

2. The combination of the locking-lever C, bail B, and stopper D with the neck-wire E, all arranged so that in a locked condition the stopper will be held down by the lever and bail, which unite with the neck-wire at three different points of the neck-wire, substantially as specified.

3. A bottle-stopping device made of a curved spring-lever, swinging over the mouth of the bottle, and having a suitable stopper attached thereto, in connection with a swinging bail, substantially as and for the purpose set forth.

ADOLPH LUTHY.

Witnesses:
T. B. MOSHER,
KARL HUTTER.